United States Patent
Lu

(10) Patent No.: US 6,542,782 B1
(45) Date of Patent: Apr. 1, 2003

(54) SYSTEMS FOR GENERATING AND USING A LOOKUP TABLE WITH PROCESS FACILITY CONTROL SYSTEMS AND MODELS OF THE SAME, AND METHODS OF OPERATING SUCH SYSTEMS

(76) Inventor: Z. Joseph Lu, 19513 N. 73rd La., Glendale, AZ (US) 85308

( * ) Notice: Subject to any disclaimer, the term of this patent is extended or adjusted under 35 U.S.C. 154(b) by 0 days.

(21) Appl. No.: 09/224,439

(22) Filed: Dec. 31, 1998

(51) Int. Cl.$^7$ .............................................. G05B 13/02
(52) U.S. Cl. ............................................ 700/29; 703/2
(58) Field of Search ........................... 700/29, 45, 44, 700/30; 703/2

(56) References Cited

U.S. PATENT DOCUMENTS

| | | | |
|---|---|---|---|
| 3,725,653 A | * 4/1973 | Carr et al. ............. 235/151.12 |
| 4,319,320 A | 3/1982 | Sato et al. |
| 4,609,855 A | * 9/1986 | Andrews ................... 318/561 |
| 4,736,316 A | 4/1988 | Wallman |
| 4,745,758 A | 5/1988 | Putman et al. |
| 4,855,896 A | 8/1989 | Oho et al. |
| 5,019,961 A | * 5/1991 | Addesso et al. .............. 700/87 |
| 5,161,110 A | 11/1992 | Dorchak |
| 5,347,447 A | * 9/1994 | Kiji et al. .................. 318/561 |
| 5,351,184 A | 9/1994 | Lu et al. |
| 5,363,320 A | * 11/1994 | Boyle et al. .................... 703/2 |
| 5,373,457 A | * 12/1994 | George et al. ................. 703/2 |
| 5,402,367 A | * 3/1995 | Sullivan et al. ................ 703/6 |
| 5,463,555 A | 10/1995 | Ward |
| 5,481,456 A | 1/1996 | Ogura |
| 5,486,995 A | 1/1996 | Krist |
| 5,518,064 A | * 5/1996 | Romanowski et al. ...... 164/453 |
| 5,561,599 A | 10/1996 | Lu |
| 5,572,420 A | 11/1996 | Lu |
| 5,574,638 A | 11/1996 | Lu |
| 5,680,333 A | * 10/1997 | Jansson .......................... 703/6 |
| 5,751,571 A | * 5/1998 | Tresp et al. .................. 700/29 |
| 5,774,382 A | * 6/1998 | Tyler et al. .................... 703/2 |
| 6,000,833 A | * 12/1999 | Gershenfeld et al. .......... 703/2 |

FOREIGN PATENT DOCUMENTS

| | | |
|---|---|---|
| DE | 37 15437 A1 | 11/1987 |
| DE | 37 15 437 A | 11/1987 |
| EP | 0756 219 A2 | 1/1997 |
| WO | WO 98/50832 | 11/1998 |

\* cited by examiner

*Primary Examiner*—Emanuel Todd Voeltz
*Assistant Examiner*—Edward F. Gain, Jr.
(74) *Attorney, Agent, or Firm*—Davis Munck

(57) ABSTRACT

Systems and methods of operating the same are introduced for populating and using lookup tables with process facility control systems and models of the same. An exemplary computer system for use with a process facility having a plurality of associated processes, and includes both a memory and a processor. The memory is capable of maintaining (i) a data structure having a plurality of accessible fields and (ii) a model of at least a portion of the plurality of associated processes. The model may include a mathematical representation of at least a portion of the at least one process, defining certain relationships among inputs and outputs of the at least one process. The processor is capable of populating ones of the plurality of accessible fields of the data structure using the model iteratively with a range of possible values of the at least one measurable characteristic. The computer system is capable of using the range of possible values of the at least one measurable characteristic to predict an unforced response associated with the at least one process.

19 Claims, 4 Drawing Sheets

SYSTEMS FOR GENERATING AND USING A LOOKUP TABLE WITH PROCESS FACILITY CONTROL SYSTEMS AND MODELS OF THE SAME, AND METHODS OF OPERATING SUCH SYSTEMS

CROSS-REFERENCE TO RELATED PATENT DOCUMENTS

The present invention is related to that disclosed in (i) U.S. Pat. No. 5,351,184 entitled "Method of Multivariable Predictive Control Utilizing Range Control;" (ii) U.S. Pat. No. 5,561,599 entitled "Method of Incorporating Independent Feedforward Control in a Multivariable Predictive Controller;" (iii) U.S. Pat. No. 5,574,638 entitled "Method of Optimal scaling of Variable in a Multivariable Predictive Controller Utilizing Range Control;" (iv) U.S. Pat. No. 5,572,420 entitled "Method of Optimal Controller Design of Multivariable Predictive Control Utilizing Range Control;" (the "'420 Patent"); (v) U.S. Pat. No. 5,758,047 entitled "Method of Process Controller Optimization in a Multivariable Predictive Controller;" (vi) U.S. patent application Ser. No. 08/490,499, filed on Jun. 14, 1995, entitled "Method of Process Controller Optimization in a Multivariable Predictive Controller;" (vii) U.S. patent application Ser. No. 08/850,288 entitled "Systems and Method for Globally Optimizing a Process Facility;" (viii) U.S. patent application Ser. No. 08/851,590 entitled "Systems and Method Using Bridge Models to Globally Optimize a Process Facility;" (ix) U.S. patent application Ser. No. 09/137,358 entitled "Controllers that Determine Optimal Tuning Parameters for Use in Process Control Systems and Methods of Operating the Same;" and (x) U.S. patent application Ser. No. 09/224,433, entitled "Process Facility Control Systems Using an Efficient Prediction form and Methods of Operating the Same" (which application is filed concurrently herewith), all of which are commonly assigned to the assignee of the present invention. The disclosures of these related patents and patent applications are incorporated herein by reference for all purposes as if fully set forth herein.

COPYRIGHT NOTICE

A portion of the disclosure of this patent document (software listings in Appendices A and B) contains material that is subject to copyright protection. The copyright owner has no objection to the facsimile reproduction by anyone of this patent document or the patent disclosure, as it appears in the United States Patent and Trademark Office patent file or records, but otherwise reserves all copyright rights and protection whatsoever.

COMPUTER PROGRAM LISTING APPENDIX

A computer program listing appendix that lists the steps of a computer program that is used in carrying out the present invention is set forth in Appendix A and in Appendix B. The computer program listing in Appendix A and in Appendix B is provided on a Compact Disc—Read Only Memory(CD-ROM) in accordance with 37 CFR §1.52(e). The computer program listing appendix that is set forth in Appendix A and in Appendix B is hereby incorporated by reference in this document for all purposes. A copy of Appendix A and a copy of Appendix B are on CD-ROM Copy 1 and duplicate copies of Appendix A and Appendix B are on CD-ROM Copy 2. Each CD-ROM contains a file entitled "AppendixCD-ROM" that is 51 KB in length and that was created on Jun. 17, 2002.

TECHNICAL FIELD OF THE INVENTION

The present invention is directed, in general, to control systems for process facilities and, more specifically, to systems for generating and using lookup tables with process facility control systems and models of the same, and methods of operating such systems, all for use to optimize process facilities.

BACKGROUND OF THE INVENTION

Presently, process facilities (e.g., a manufacturing plant, a mineral or crude oil refinery, etc.) are managed using distributed control systems. Contemporary control systems include numerous modules tailored to control or monitor various associated processes of the facility. Conventional means link these modules together to produce the distributed nature of the control system. This affords increased performance and a capability to expand or reduce the control system to satisfy changing facility needs.

Process facility management providers, such as Honeywell, Inc., develop control systems that can be tailored to satisfy wide ranges of process requirements (e.g., global, local or otherwise) and facility types (e.g., manufacturing, refining, etc.). A primary objective of such providers is to centralize control of as many processes as possible to improve an overall efficiency of the facility. Each process, or group of associated processes, has certain input (e.g., flow, feed, power, etc.) and output (e.g., temperature, pressure, etc.) characteristics associated with it.

In recent years, model predictive control ("MPC") techniques have been used to optimize certain processes as a function of such characteristics. One technique uses algorithmic representations to estimate characteristic values (represented as parameters, variables, etc.) associated with them that can be used to better control such processes. In recent years, physical, economic and other factors have been incorporated into control systems for these associated processes. Examples of such techniques are described in U.S. Pat. No. 5,351,184 entitled "Method of Multivariable Predictive Control Utilizing Range Control;" U.S. Pat. No. 5,561,599 entitled "Method of Incorporating Independent Feedforward Control in a Multivariable Predictive Controller;" U.S. Pat. No. 5,574,638 entitled "Method of Optimal Scaling of Variables in a Multivariable Predictive Controller Utilizing Range Control;" U.S. Pat. No. 5,572,420 entitled "Method of Optimal Controller Design of Multivariable Predictive Control Utilizing Range Control" (the "'420 Patent"); U.S. patent application Ser. No. 08/850,288 entitled "Systems and Methods for Globally Optimizing a Process Facility;" U.S. patent application Ser. No. 08/851,590 entitled "Systems and Methods Using Bridge Models to Globally Optimize a Process Facility;" and U.S. patent application Ser. No. 09/137,358 entitled "Controllers that Determine Optimal Tuning Parameters for use in Process Control Systems and Methods of Operating the Same," all of which are commonly owned by the assignee of the present invention and incorporated herein above by reference for all purposes.

Generally speaking, one problem is that conventional efforts, when applied to specific processes, tend to be non-cooperative (e.g., non-global, non-facility wide, etc.) and may, and all too often do, detrimentally impact the efficiency of the process facility as a whole. For instance, many MPC techniques control process variables to predetermined set points. Oftentimes the set points are a best estimate of a value of the set point or set points. When a process is being controlled to a set point, the controller may not be able to achieve the best control performances, especially under process/model mismatch.

To further enhance the overall performance of a control system, it is desirable to design a controller that deals explicitly with plant or model uncertainty. The '420 Patent, for example, teaches methods of designing a controller utilizing range control. The controller is designed to control a "worst case" process. An optimal controller for the process is achieved and, if the actual process is not a "worst case process," the performance of the controller is better than anticipated.

There are a number of well known PID "tuning" formulas, or techniques, and the most common, or basic, PID algorithm includes three known user specified tuning parameters (K, $\tau_1$, $\tau_2$) whose values determine how the controller will behave. These parameters are determined either by trial and error or through approaches that require knowledge of the process. Although many of these approaches, which are commonly algorithms, have provided improved control, PID controller performance tuned by such algorithms usually degrades as process conditions change, requiring a process engineer, or operator, to monitor controller performance. If controller performance deteriorates, the process engineer is required to "re-tune" the controller.

Controller performance deteriorates for many reasons, although the most common cause is changing dynamics of the process. Since PID controller performance has been related to the accuracy of the process model chosen, a need exists for PID controllers that allows for such uncertainty by accounting for changing system dynamics. Further, the requirement for ever-higher performance control systems demands that system hardware maximize software performance. Conventional control system architectures are made up of three primary components: (i) a processor, (ii) a system memory and (iii) one or more input/output devices. The processor controls the system memory and the input/output ("I/O") devices. The system memory stores not only data, but also instructions that the processor is capable of retrieving and executing to cause the control system to perform one or more desired functions. The I/O devices are operative to interact with an operator through a graphical user interface, and with the facility as a whole through a network portal device and a process interface.

Over the years, the quest for ever-increasing process control system speeds has followed different directions. One approach to improve control system performance is to increase the rate of the clock that drives the system hardware. As the clock rate increases, however, the system hardware's power consumption and temperature also increase. Increased power consumption is expensive and high circuit temperatures may damage the process control system. Further, system hardware clock rate may not increase beyond a threshold physical speed at which signals may be processed. More simply stated, there is a practical maximum to the clock rate that is acceptable to conventional system hardware.

An alternate approach to improve process control system performance is to increase the number of instructions executed per clock cycle by the system processor ("processor throughput"). One technique for increasing processor throughput calls for the processor to be divided into separate processing stages. Instructions are processed in an "assembly line" fashion in the processing stages. Each processing stage is optimized to perform a particular processing function, thereby causing the processor as a whole to become faster. There is again a practical maximum to the clock rate that is acceptable to conventional system hardware.

Since there are discernable physical limitations to which conventional system hardware may be utilized, a need exists broadly for an approach that decreases the number of instructions required to preform the functions of the process control system. A need exists for such an approach that accounts for process uncertainty by accounting for changing process dynamics.

SUMMARY OF THE INVENTION

To address the above-discussed deficiencies of the prior art, it is a primary object of the present invention to provide systems and methods of operating such systems for populating and using lookup tables with process facility control systems, as well as models of the same. In accordance with an exemplary embodiment below-discussed, the principles of the present invention may be used to define and populate a lookup table in response to the needs of a global controller. The lookup table is populated with a range of possible values of at least one measurable characteristic associated with one or more processes of the process facility and in accordance with a model of at least a portion of the same.

Rather than calculate and re-calculate certain characteristics associated with a process or process model, which would consume significant system resources, the present invention introduces a data structure capable of maintaining a range of possible values of one or more of such certain characteristics. Use of the lookup table in lieu of execution and re-execution of the instructions for performing characteristic calculations decreases the number of instructions required to preform the functions of the process control system. The lookup table, once suitably populated, accounts for process uncertainty by maintaining the range of possible values, thereby accounting for changing process dynamics.

An exemplary computer system for use with a process facility that is capable of populating a data structure in accordance with the principles of the present invention includes both a memory and a processor. The memory is capable of maintaining (i) the data structure, which has a plurality of accessible fields, and (ii) a model of at least a portion of at least one process of a plurality of associated processes of the process facility. The model may advantageously include a mathematical representation of at least a portion of the at least one process, defining certain relationships among inputs and outputs of the at least one process. The processor is capable of populating ones of the plurality of accessible fields of the data structure using the model iteratively with a range of possible values of the at least one measurable characteristic. The computer system is capable of using the range of possible values of the at least one measurable characteristic to predict an unforced response associated with the at least one process.

In accordance with an important aspect hereof, the data structure may be populated and maintained on-line (e.g., at a controller, distributed through a process control system, etc.), off-line (e.g., standalone computer, computer network, etc.), or through some suitable combination of the same. Likewise, the data structure may remain static upon population, be dynamic, or be modifiable, at least in part.

Those skilled in the art will understand that "controllers" may be implemented in hardware, software, or firmware, or some suitable combination of the same, and, in general, that the use of computing systems in control systems for process facilities is known. The phrase "associated with" and derivatives thereof, as used herein, may mean to include, be included within, interconnect with, contain, be contained within, connect to or with, couple to or with, be communicable with, cooperate with, interleave, be a property of, be bound to or with, have, have a property of, or the like; the term "include" and derivatives thereof, as used herein, are defined broadly, meaning inclusion without limitation; and the term "or," as used herein, means and/or.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 1b illustrates a detailed block diagram of one of the exemplary local controllers introduced in FIG. 1a;

DETAILED DESCRIPTION OF THE DRAWINGS

In accordance with the above-given summary, computer systems, and methods of operating the same, are introduced herein for populating and using lookup tables with process facility control systems, as well as models of the same. Before undertaking a detailed description of an advantageous embodiment of the present invention, and discussing the various benefits and aspects of the same, it is useful to understand conceptually the operation and control structure of an exemplary process facility.

Figure 1A:
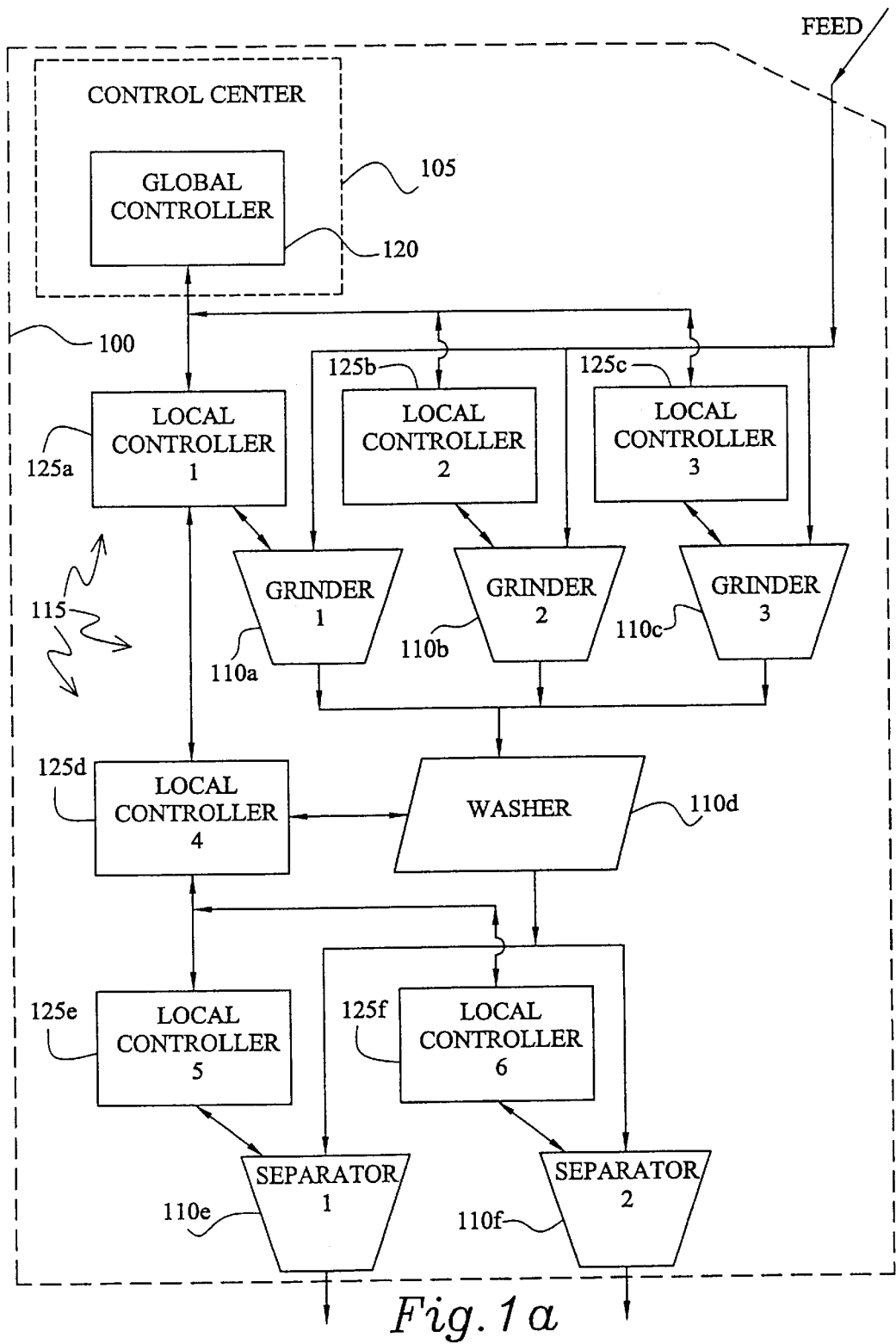
FIG. 1a illustrates a simple block diagram of an exemplary process facility with which the present invention may be used.

Initial reference is therefore made to FIG. 1a, wherein a simple block diagram of such a process facility (generally designated 100) is illustrated. Exemplary process facility 100 is operative to process raw materials, and includes a control center 105, six associated processes 110a to 110f that are arranged into three stages and a control system (generally designated 115). The term "include," as well as derivatives thereof, as used throughout this patent document, is defined broadly to mean inclusion without limitation.

Exemplary control center 105 illustrates a central area that is commonly operator manned (not shown) for centrally monitoring and for centrally controlling the three exemplary process stages. A first process stage includes three raw material grinders 110a to 110c that operate to receive a "feed" of raw material core and to grind the same, such as using a pulverizer or grinding wheel, into smaller particles of raw material. The term "or," as it is used throughout this patent document, is inclusive, meaning and/or. The second process stage includes a washer 110d that operates to receive the ground raw materials and clean the same to remove residue from the first stage. The third process stage includes a pair of separators 110e and 110f that operate to receive the ground and washed raw materials and separate the same, such as into desired minerals and any remaining raw materials. As this process facility is provided for illustrative purposes only and the principles of such are known, further discussion of the same is beyond the scope of this patent document.

Exemplary control system 115 illustratively includes a global controller 120 and six local controllers 125a to 125f, each of which is implemented in software and executable by a suitable conventional computer system (e.g., standalone, network, etc.), such as any of Honeywell, Inc.'s AM K2LCN, AM K4LCN, AM HMPU, AxM or like systems. Those skilled in the art will understand that such controllers may be implemented in hardware, software, or firmware, or some suitable combination of the same; in general, the use of computing systems in control systems for process facilities is known.

Global controller 120 is associated with each of local controllers 125, directly or indirectly, to allow communication of information between the same. The phrase "associated with" and derivatives thereof, as used throughout this patent document, may mean to include within, interconnect with, contain, be contained within, connect to or with, couple to or with, be communicable with, cooperate with, interleave, be a property of, be bound to or with, have, have a property of, or the like.

Global controller 120 monitors measurable characteristics (e.g., status, temperature, utilization, efficiency, cost and other economic factors, etc.) of associated processes 110, either directly or indirectly (as shown, through local controllers 125 associated with processes 110). Depending upon the implementation, such monitoring may be of an individual process, group of processes, the facility as a whole, or otherwise. Similarly, local controllers 125 monitor associated processes 110, and, more particularly, monitor certain characteristics of associated processes 110.

Global controller 120 generates, in response to such monitoring efforts, control data that may be communicated via local controllers 125 to associated processes 110 to optimize process facility 100. The phrase "control data," as used herein, is defined as any numeric, qualitative or other value generated by global controller 120 to globally control (e.g., direct, manage, modify, recommend to, regulate, suggest to, supervise, cooperate, etc.) a particular process, a group of processes, a facility, a process stage, a group of process stages, a sequence of processes or process stages, or the like to optimize the facility. Local controllers 125 operate to varying degrees in accordance with the control data to control the associated processes, and, more particularly, to modify one or more processes and improve the monitored characteristics and the facility.

According to an advantageous embodiment, the control data may be dynamically generated using a lookup table defined and populated in accordance with the principles hereof, and such control data generation is based, at least in part, upon a given facility's efficiency, production or economic cost, and, most preferably, all three. The lookup table may be populated and maintained on-line (e.g., at global controller 120, at local controller 125, distributed within control system 115, etc.), off-line (e.g., standalone computer, network computer, etc.), or through some suitable combination of the same; likewise, the lookup table may be static upon population, be dynamic, or be modifiable, at least in part.

The global controller 120 and the local controllers 125 may suitably use one or more such lookup tables to control processes 110 to conserve processing resources and increase the overall speed of control system 115. Control system 115 achieves a high level of both global and local monitoring, and cooperative control of associated processes 110 among controllers 120 and 125, by allowing the local controllers 125 to vary their individual or respective compliance with the control data. Varying degrees of compliance by local controllers 125 may range between full compliance and noncompliance. The relationship between global controller 120 and various ones of local controllers 110 may be master-slave (full compliance), cooperative (varying compliance, e.g., using control data as a factor in controlling the associated processes), complete disregard (noncompliance), as well as anywhere along that range.

Depending upon the implementation and needs of a given facility, the relationship between global controller 120 and specific local controllers 125 may be static (i.e., always only one of compliance, cooperative, or noncompliance), dynamic (i.e., varying over time, such as within a range between compliance and noncompliance, some lesser range therebetween, or otherwise), or varying between the same. One or more specific processes 110, and facility 100 as a whole, may be dynamically and cooperatively controlled as a function of local and global optimization efforts, and such dynamic and cooperative control is independent of the relationship between global controller 120 and specific local controllers 125, as described above.

Figure 1B:
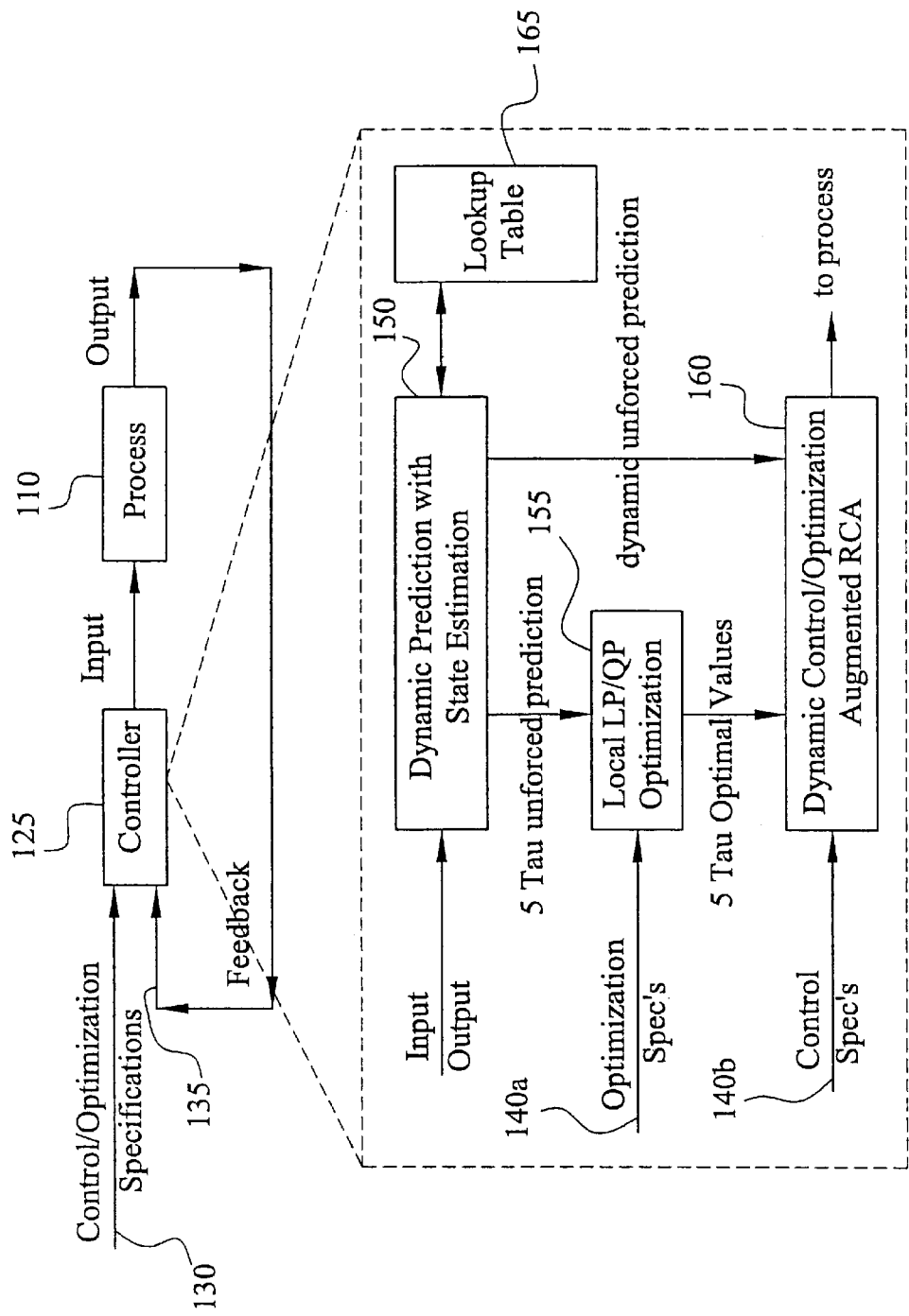

Turning to FIG. 1b, illustrated is a more detailed block diagram of one of the exemplary local controllers 125 that is associated with one or group of associated processes 110. Local controller 125 uses a single loop model predictive control ("SL-MPC") structure that uses an efficient matrix prediction form in accordance with the principles of the present invention, as well as an analytical control solution map to reduce utilization of processing resources relative to conventional MPC technology.

According to the illustrated embodiment, local controller 125 IS receives as inputs, control/optimization specifications 130 (e.g., bounds, ranges, tolerances, control points, etc.) and feedback data 135 (e.g., output of associated process 110). Control/optimization specifications 130 may be received from any of a number of sources depending upon the associated process or group of associated processes 110, an associated process facility or any other factor. For example, any of control/optimization specifications 130 may be received from an operator of a control center for the associated process facility, retrieved from a database or data repository, received from another associated controller (e.g., one or more local controllers 125, global controller 120, or a suitable combination thereof), etc.

Control/optimization specifications 130 include two types of variables: (1) a first variable ("MV") that may be manipulated, such as flow, feed, air blower, etc; and (2) a second variable ("DV") that cannot be manipulated and is a disturbance variable, such as burn rate, fuel quality per unit, etc. Feedback data 135 is a third variable ("CV") that is responsive to MVs and DVs, and is an output of associated process 110, such as pressure, temperature, etc. A sub-variable ("PV") of Feedback data 135 is indicative of the iterative response of the associated process 110 to monitoring and control by the local controller 125. Many, if not all, of such MVs, DVs and CVs represent measurable characteristics of associated process 110 that may be suitably monitored by local controller 125.

Local controller 125 includes a dynamic prediction task with state estimation 150, a local linear program/quadratic program ("LP/QP") optimization task 155, a dynamic control/optimization augmented range control algorithm ("RCA") 160 and a lookup table 165. Exemplary dynamic prediction task 150 receives CVs and operates to generate an array of multiple predictions (or dynamic unforced predictions) and, at 5 tau (response time close to end), an unforced prediction for values associated with associated process 110. The CVs represent feedback data 135 (e.g., inputs, outputs, etc.) associated with process 105, and dynamic prediction task 150 operates to accesses lookup table 165 and selects one or more values from the range of possible values, such selection being responsive, at least in part, to the received feedback data 135. A preferred method of using data structures, such as lookup table 165, or functionally equivalent dedicated circuitry, to maintain a range of possible values for one or more measurable characteristics associated with a process is disclosed and described in U.S. patent application Ser. No. 09/224,433 , entitled "Process Facility Control Systems Using an Efficient Prediction Form and Methods of Operating the Same" and filed concurrently herewith, the disclosure of which has previously been incorporated herein by reference for all purposes as if fully set forth herein.

Exemplary local LP/QP optimization task 155 receives optimization specifications 140a and, in response to the unforced prediction, operates to generate, at 5 tau, optimal values associated with associated process 110.

A preferred method of performing the foregoing task is disclosed and described in U.S. Pat. No. 5,758,047, entitled "Method of Process Controller Optimization in a Multivariable Predictive Controller," which is commonly owned by the assignee of this patent document and related invention, the disclosure of which has previously been incorporated herein by reference for all purposes as if fully set forth herein. Most preferably, optimization specifications 140a are associated, directly or indirectly, with an economic value of the output of associated process 110. According to an advantageous embodiment, the unforced prediction may suitably be represented as a single variable and the LP/QP optimization task may be a linear determination of a minimum value or a maximum value, or a quadratic determination of a desired value. Exemplary dynamic control/ optimization augmented RCA 160 receives control specifications 140b and, in response to receiving the array of multiple predictions (from dynamic prediction task 150) and the optimal values (from local LP/QP optimization task 155), operates to generate control values, the MVs, that are input to associated process 110. An important aspect of exemplary local controller 125 is the use of control/ optimization specifications 140 and feedback data 135 to locally unify economic/operational optimization with MPC dynamically for a specific process or group of processes.

Note the distinction between the foregoing discussion which introduces a very powerful multi-loop MPC embodiment having a well defined and dynamic interaction/ interleaving relation among global and local controllers and the single loop controller embodiment described in U.S. Patent Application Ser. No. 09/224,433 , the disclosure of which has previously been incorporated herein by reference for all purposes. Those skilled in the art will understand the relationship among these embodiments and the applicability of the principles of the present invention.

Figure 2:
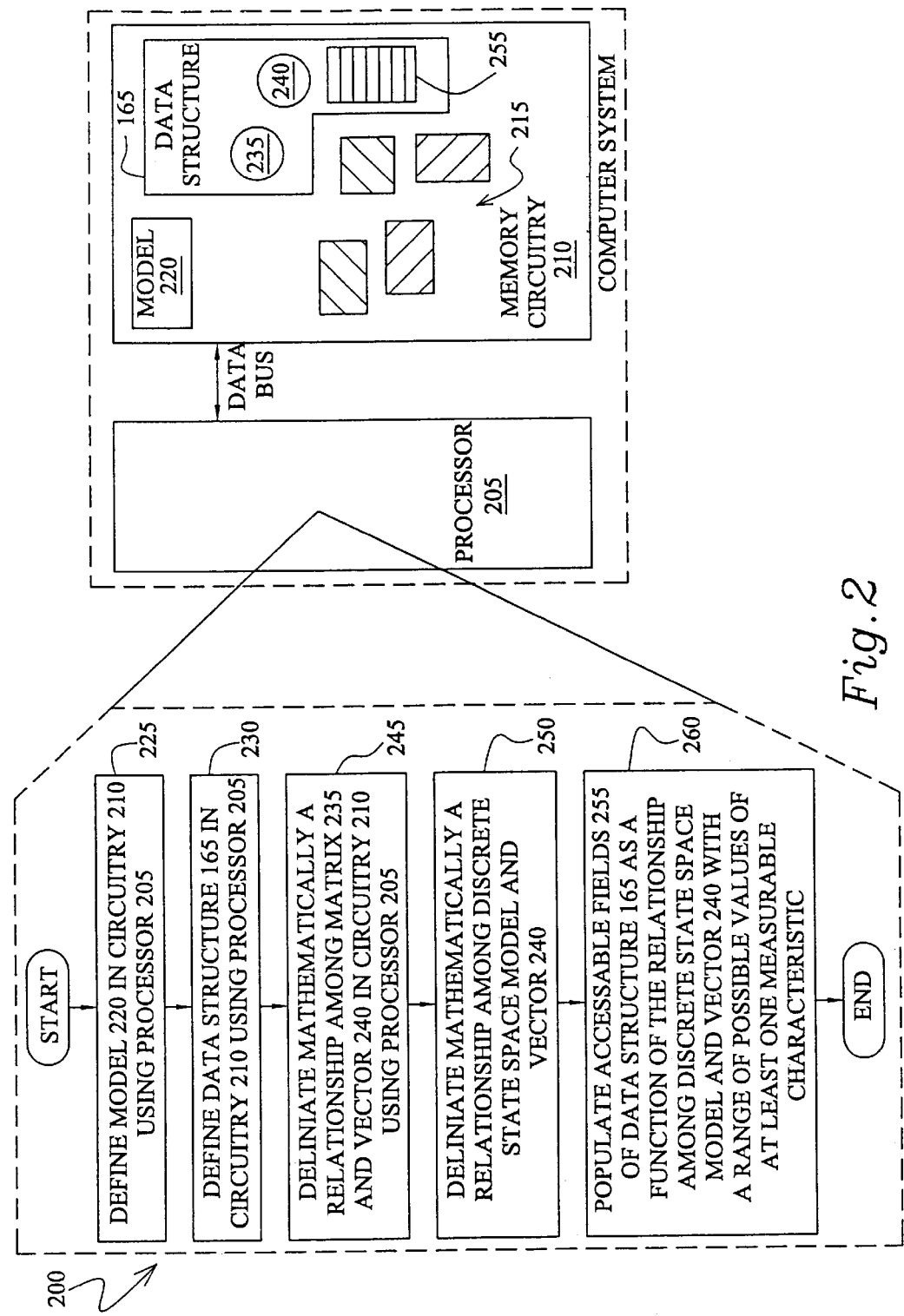
FIG. 2 illustrates a flow diagram of an exemplary method for populating a data structure in accordance with the principles of the present invention.

Turning now to FIG. 2, illustrated is a flow diagram of an exemplary method (generally designated 200) for populating a data structure 165, shown as a lookup table, in accordance with the principles of the present invention (this discussion of FIG. 2 makes concurrent reference to FIGS. 1a and 1b). The phrase "data structure," as the same is used herein, is defined broadly as any syntactic structure of expressions, data or other values or indicia, including both logical and physical structures. A data structure may therefore be any array (i.e., any arrangement of objects into one or more dimensions, e.g., a matrix, a table, etc.), or other like grouping, organization, or categorization of objects in accordance herewith.

For purposes of illustration, a processor 205 and a memory 210 are introduced. Exemplary memory 210 is operative to store, or to maintain, lookup table 165, along with the various tasks/instructions (generally designated 215) comprising method 200. Exemplary processor 205 is operative to select and execute tasks/instructions 215 which, in turn, cause processor 205 to perform the functions of method 200.

To begin, processor 205 is directed through the execution of method 200 (e.g., manually (i.e., through interaction with an operator), automatically, or partially-automatically) to define a model 220 of at least a portion of at least one of the associated processes 110 (process step 225). Processor 205 is directed to store model 220 in memory 210, preferably representing at least a portion of process 110 mathematically. The mathematical representation defines one or more relationships among inputs and outputs of process 110.

According to an advantageous embodiment, model 220 is defined using the following discrete state space model form:

$$x_{k+1} = Ax_k + Bu_k \quad (1)$$

$$y_k = Cx_k + Du_k \quad (2)$$

wherein $x_k$, $u_k$, and $y_k$ represent various states of modeled process 110, wherein k is a time period and k+1 is a next time period, and A, B, C, and D respectively represent measurable characteristics of modeled process 110 at any given time period.

Processor 205 is directed to define a data structure, such as lookup table 165, having a plurality of accessible fields (process step 230). An exemplary source code embodiment for performing this definition is attached as APPENDIX A, and incorporated herein by reference as if fully set forth herein, and that is written in Pascal. Depending upon the needs of the particular implementation, the contents of such accessible fields may suitably be nulled, defaulted, or otherwise initialized or used. Memory 210, directed by processor 205, maintains lookup table 165, preferably representing, at least in part, an AB0I matrix 235 and a feedback vector 240.

Figure 3:
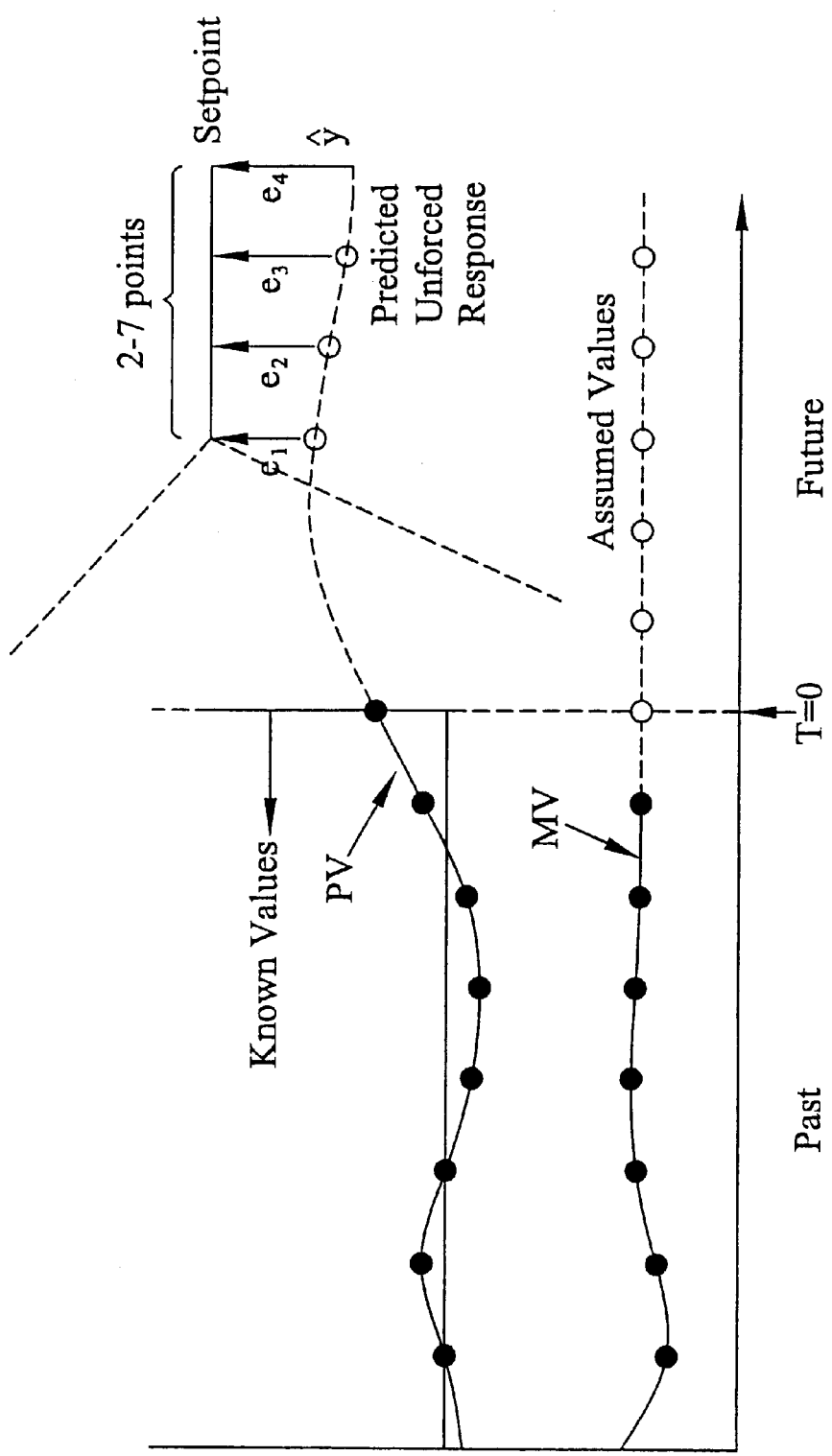
FIG. 3 illustrates an exemplary two-dimensional graphical representation of MV and PV curves in accordance with the principles of the present invention.

According to an advantageous embodiment, AB0I matrix 235 and feedback vector 240 have the following respective definitions:

$$\begin{bmatrix} A & B \\ 0 & I \end{bmatrix} \quad (3)$$

$$\begin{bmatrix} x_k \\ u_k \end{bmatrix} \quad (4)$$

wherein I and 0 respectively and illustratively represent an identity matrix and an null matrix, for the purpose of this illustrative model, to maintain, or hold, MV constant (illustrated with respect to FIG. 3).

Processor 205 is directed to delineate mathematically a relationship among the above-given matrix 235 and vector 240 (process step 245), which according to an advantageous embodiment, has the following form:

$$z_{k+1} = \begin{bmatrix} A & B \\ 0 & I \end{bmatrix} Z_k, \quad Z_k = \begin{bmatrix} x_k \\ u_k \end{bmatrix} \quad (5)$$

Processor 205 is directed to delineate mathematically a relationship among the above-given discrete state space model form and the Z vector 240 (process step 250), which, according to an advantageous embodiment, gives the following prediction form for any p interval, or point in the future:

$$\hat{y}(k+p)|k = [CD]\begin{bmatrix} A & B \\ 0 & I \end{bmatrix}^p Z_k \quad (6)$$

Stated generally, use of Z vector 240 represents, or defines, mathematically, the relationship among the one or more inputs and outputs of modeled process 110.

For a variety of purposes, as above-stated, for monitoring and for control of process 110, it is desirable to decrease utilization of processing resources. This may be accomplished, in part, through a recognition that certain characteristics of process 110 are measurable (e.g., appraising, assessing, gauging, valuating, estimating, comparing, computing, rating, grading, synchronizing, analyzing, etc.), whether or not such characteristics are dependent, independent, interdependent, or otherwise effected by other characteristics of the same process, a group of processes, a facility, a process stage, a group of process stages, a sequence of processes or process stages, or the like. Many of these measurable characteristics have a range of possible values, which may or may not change, or vary, over time. It is desirable, in the present example, to determine an efficient prediction form ("EPF"), the range of values of which may suitably be maintained in lookup table 165.

Processor 205 is directed to populate ones of the accessible fields 255 of lookup table 165 with a range of possible values of at least one measurable characteristic associated with at least process 110 (process step 260). An exemplary source code embodiment for performing this population is attached as Appendix B, and incorporated herein by reference as if fully set forth herein, and that is written in Pascal. According to the illustrative embodiment, it is desirable to have future predictions available, or precalculated, which may suitably be stored as an array of points within lookup table 165. This collection of points may be referred to as PV-blocking, which may be given by the following form for any $p_i$ interval, or point in the future:

$$\hat{Y}(k+pv\text{-}blocking)|k = \begin{bmatrix} \hat{y}(k+p_1)|k \\ \hat{y}(k+p_2)|k \\ \vdots \\ \hat{y}(k+p_m)|k \end{bmatrix} \quad (7)$$

wherein i is the index for PV-blocking. The foregoing calculation may suitably be condensed into a product of EPF and $Z_k$, which may be given by:

$$\hat{y}(k+pv\text{-}blocking)|k = [^{EPF}]z_k \quad (8)$$

wherein EPF may be given by:

$$[EPF] = \begin{bmatrix} epf_1 \\ epf_2 \\ \vdots \\ epf_m \end{bmatrix} \quad (9)$$

wherein $epf_i$ is independent from the feed back information contained in the Z vector and may therefore be calculated in advance and given by:

$$epf_i = [CD]\begin{bmatrix} A & B \\ 0 & I \end{bmatrix}^{pi} \quad (10)$$

In short, exemplary processor 205 uses model 220 iteratively, or incrementally, to populate lookup table 165 with k possible values, thereby defining a range of values. A $v_k$ vector is formulated to conveniently calculate both $Z_k$ and $y_{(k+pvblocking)|k}$ for different incremental k, which has the following form:

$$V_{k+1} = \begin{bmatrix} AB \\ 0I \\ EPF \end{bmatrix} Z_k, \quad V_k = \begin{bmatrix} z_k \\ \hat{y}(k + pvblocking)|k \end{bmatrix} \quad (11)$$

Turning momentarily to FIG. 3, illustrated is an exemplary two-dimensional graphical representation of MV and PV curves in accordance with a use of lookup table 165 in accordance with the control system 100 of FIGS. 1a and 1b and the principles of the present invention. It should be noted, that FIGS. 1a, 1b, 2, and 3, along with the various embodiments used to describe the principles of the present invention in this patent document are illustrative only. To that end, alternate embodiments of model 220 may define any particular process, a group of processes, a facility, a process stage, a group of process stages, an interrelationship among, or a sequence of, processes or process stages, or some suitable portion or combination of any of the same. It should be further noted that a matrix structure was chosen for the EPF in this embodiment, however, alternate embodiments may use any appropriate data structure or dedicated circuitry to create a suitably arranged lookup array, or table, or the like. Such data structures and dedicated circuitry may be populated off-line, on-line or through some suitable combination of the same; likewise, such populated data structures and dedicated circuitry may be static, dynamic, modifiable, centralized, distributed, or any suitable combination of the same.

Those of ordinary skill in the art should recognize that the computer system 105 described using processor 205 and memory 210 may be any suitably arranged hand-held, laptop/notebook, mini, mainframe or super computer, as well as network combination of the same. In point of fact, alternate embodiments of computer system 205 may include, or be replaced by, or combined with, any suitable circuitry, including programmable logic devices, such as programmable array logic ("PALs") and programmable logic arrays ("PLAs"), digital signal processors ("DSPs"), field programmable gate arrays ("FPGAs"), application specific integrated circuits ("ASICs"), very large scale integrated circuits ("VLSIs") or the like, to form the processing systems described and claimed herein. To that end, while the disclosed embodiments require processor 205 to access and to execute a stored task/instructions from memory to perform the various functions described hereabove, alternate embodiments may certainly be implemented entirely or partially in hardware. Conventional processing system architecture is more fully discussed in *Computer Organization and Architecture*, by William Stallings, MacMillan Publishing Co. (3rd ed. 1993); conventional processing system network design is more fully discussed in *Data Network Design*, by Darren L. Spohn, McGraw-Hill, Inc. (1993); and conventional data communications is more fully discussed in *Data Communications Principles*, by R. D. Gitlin, J. F. Hayes and S. B. Weinstein, Plenum Press (1992) and in *The Irwin Handbook of Telecommunications*, by James Harry Green, Irwin Professional Publishing (2nd ed. 1992). Each of the foregoing publications is incorporated herein by reference for all purposes.

What is claimed is:

1. A computer system for use with a process facility having a plurality of associated processes, comprising:

circuitry that maintains a first data structure having a plurality of accessible fields; and a processor, associated with said circuitry, that populates ones of said plurality of accessible fields of said first data structure with a range of possible values of at least one measurable characteristic associated with at least one process of said plurality of associated processes;

wherein said circuitry maintains a model of at least a portion of said plurality of associated processes and wherein said model comprises a discrete state space model of the form:

$x_{k+1} = Ax_k + Bu_k$ and $y_k = Cx_k + Du_k$ where $x_k$ and $u_k$ and $y_k$ represent states of a modeled process and where k is a time period and k+1 is a next time period and where A, B, C, and D respectively represent measurable characteristics of said modeled process at any given time period.

2. The computer system set forth in claim 1 wherein said circuitry stores a task that directs said processor to populate said ones of said plurality of accessible fields of said first data structure with said range of possible values.

3. The computer system set forth in claim 1 wherein said circuitry maintains said model comprising a second data structure of at least a portion of said plurality of associated processes wherein said second data structure comprises an AB0I matrix of the form:

$$\begin{bmatrix} A & B \\ 0 & I \end{bmatrix}$$

where A and B represent measurable characteristics of a modeled process and where I is an identity matrix and 0 is a null matrix and wherein said second data structure comprises a feedback vector of the form:

$$\begin{bmatrix} x_k \\ u_k \end{bmatrix}$$

where $x_k$ and $u_k$ represent states of said modeled process and where k is a time period.

4. The computer system set forth in claim 3 wherein said model includes a mathematical representation of at least a portion of said at least one process of said plurality of associated processes, said mathematical representation defining relationships among inputs and outputs of said at least one process of said associated processes wherein said mathematical relationship is of the form:

$$Z_{k+1} = \begin{bmatrix} A & B \\ 0 & I \end{bmatrix} Z_k$$

where $Z_k$ represents a state space vector of the form:

$$Z_k = \begin{bmatrix} x_k \\ u_k \end{bmatrix}.$$

5. The computer system set forth in claim 4 wherein said processor uses said model iteratively to populate ones of said plurality of accessible fields of said first data structure with said range of possible values of said at least one measurable characteristic wherein said model gives a prediction form for any point p in the future and wherein said prediction is of the form:

$$\hat{y}(k+p)|_k = [C \quad D] \begin{bmatrix} A & B \\ 0 & I \end{bmatrix}^p Z_k.$$

6. The computer system set forth in claim 5 wherein said model includes at least one feedback variable representing, at least in part, an output of said at least one process of said associated processes.

7. The computer system set forth in claim 6 wherein said processor populates at least one of said plurality of accessible fields of said first data structure in response to said at least one feedback variable of said at least one process of said associated processes.

8. The computer system set forth in claim 3 wherein said model includes a manipulable variable.

9. The computer system set forth in claim 8 wherein said processor at least substantially maintains a value of said manipulable variable during at least a portion of said iterative population of said ones of said plurality of accessible fields of said first data structure.

10. The computer system set forth in claim 1, wherein said circuitry maintains statically said range of possible values of said at least one measurable characteristic associated with at least one process of said plurality of associated processes.

11. The computer system set forth in claim 1 wherein said processor uses said range of possible values of said at least one measurable characteristic to predict an unforced response associated with said at least one process.

12. A method of operating a computer system that is for use with a process facility having a plurality of associated processes, said method of operation comprising the steps of:
    maintaining a first data structure having a plurality of accessible fields in circuitry associated with said computer system;
    populating ones of said plurality of accessible fields of said first data structure using a processor, that is associated with said circuitry, with a range of possible values of at least one process of said plurality of associated processes; and
    maintaining a model in said circuitry of at least a portion of said plurality of associated processes wherein said model comprises a discrete state space model of the form:

$x_{k+1} = Ax_k + Bu_k$ and $y_k = Cx_k + Du_k$ where $x_k$ and $u_k$ and $y_k$ represent states of a modeled process and where k is a time period and k+1 is a next time period and where A, B, C, and D respectively represent measurable characteristics of said modeled process at any given time period.

13. The method of operation set forth in claim 12 further comprising the step of storing a task in said circuitry that directs said processor to populate said ones of said plurality of accessible fields of said first data structure with said range of possible values.

14. The method of operation set forth in claim 12 further comprising the step of maintaining said model comprising a second data structure of at least a portion of said plurality of associated processes in said circuitry wherein said second data structure comprises an AB0I matrix of the form:

$$\begin{bmatrix} A & B \\ 0 & I \end{bmatrix}$$

where A and B represent measurable characteristics of a modeled process and where I is an identity matrix and 0 is a null matrix and wherein said second data structure comprises a feedback vector of the form:

$$\begin{bmatrix} x_k \\ u_k \end{bmatrix}$$

where $x_k$ and $u_k$ represent states of said modeled process and where k is a time period.

15. The method of operation set forth in claim 14 wherein said model includes a mathematical representation of at least a portion of said at least one process of said plurality of associated processes, said mathematical representation defining relationships among inputs and outputs of said at least one process of said associated processes, wherein said mathematical relationship is of the form:

$$Z_{k+1} = \begin{bmatrix} A & B \\ 0 & I \end{bmatrix} Z_k$$

where $Z_k$ represents a state space vector of the form:

$$Z_k = \begin{bmatrix} x_k \\ u_k \end{bmatrix}$$

and said method further comprises the step of using said model iteratively by said processor to populate ones of said plurality of accessible fields of said first data structure with said range of possible values of said at least one measurable characteristic wherein said model gives a prediction form for any point p in the future and wherein said prediction is of the form:

$$\hat{y}(k+p)|_k = [C \quad D] \begin{bmatrix} A & B \\ 0 & I \end{bmatrix}^p Z_k.$$

16. The method of operation set forth in claim 15 wherein said model includes at least one feedback variable representing, at least in part, an output of said at least one process of said associated processes, and said method further comprises the step of using said processor, in response to said at least one feedback variable of said at least one process of said associated processes, to populate at least one of said plurality of accessible fields of said first data structure.

17. The method of operation set forth in claim 14 wherein said model includes a manipulable variable, and said method further comprises the step of at least substantially maintaining a value of said manipulable variable during at least a portion of said iterative population of said ones of said plurality of accessible fields of said first data structure.

18. The method of operation set forth in claim 12 wherein said circuitry maintains statically said range of possible values of said at least one measurable characteristic associated with at least one process of said plurality of associated processes.

19. The method of operation set forth in claim 12 further comprising the step of predicting an unforced response associated with said at least one process using said processor and said range of possible values of said at least one measurable characteristic.

\* \* \* \* \*